(12) United States Patent
Laurent et al.

(10) Patent No.: US 11,275,035 B2
(45) Date of Patent: Mar. 15, 2022

(54) MILLIMETER WAVE REFLECTION TEST APPARATUS

(71) Applicant: MILLIWAVE SILICON SOLUTIONS, INC., San Jose, CA (US)

(72) Inventors: JeanMarc Laurent, San Jose, CA (US); Chinh Doan, San Jose, CA (US)

(73) Assignee: Milliwave Silicon Solutions, Inc., San Jose, CA (US)

(*) Notice: Subject to any disclaimer, the term of this patent is extended or adjusted under 35 U.S.C. 154(b) by 0 days.

(21) Appl. No.: 17/033,589

(22) Filed: Sep. 25, 2020

(65) Prior Publication Data

US 2021/0096074 A1 Apr. 1, 2021

Related U.S. Application Data

(60) Provisional application No. 62/907,134, filed on Sep. 27, 2019.

(51) Int. Cl.
| | | |
|---|---|---|
| *G01R 27/04* | (2006.01) | |
| *G01R 27/32* | (2006.01) | |
| *G01N 22/00* | (2006.01) | |
| *G01N 21/59* | (2006.01) | |
| *G01N 21/55* | (2014.01) | |
| *G01N 21/3581* | (2014.01) | |
| *G01N 22/04* | (2006.01) | |
| *G01N 22/02* | (2006.01) | |
| *G01N 35/00* | (2006.01) | |
| *G01F 23/284* | (2006.01) | |
| *G01F 1/40* | (2006.01) | |
| *G01F 1/56* | (2006.01) | |
| *G01F 1/74* | (2006.01) | |

(52) U.S. Cl.
CPC ......... *G01N 22/00* (2013.01); *G01N 21/3581* (2013.01); *G01N 21/55* (2013.01); *G01N 21/59* (2013.01); *G01N 22/02* (2013.01); *G01N 22/04* (2013.01); *G01F 1/40* (2013.01); *G01F 1/56* (2013.01); *G01F 1/74* (2013.01); *G01F 23/284* (2013.01); *G01N 2035/00178* (2013.01); *G01N 2201/101* (2013.01)

(58) Field of Classification Search
CPC .... G01N 22/00; G01N 21/3581; G01N 22/04; G01N 22/02; G01N 21/55; G01N 21/59; G01N 2035/00178; G01N 2201/101; G01F 23/284; G01F 1/40; G01F 1/56; G01F 1/74
USPC ........... 324/76.11–76.83, 459, 600, 629, 637
See application file for complete search history.

(56) References Cited

U.S. PATENT DOCUMENTS

| | | | | |
|---|---|---|---|---|
| 2008/0262480 | A1* | 10/2008 | Stabler | A61B 34/37 606/1 |
| 2008/0262513 | A1* | 10/2008 | Stabler | A61B 34/30 606/130 |
| 2019/0365348 | A1* | 12/2019 | Toume | A61B 8/4236 |

\* cited by examiner

*Primary Examiner* — Raul J Rios Russo
(74) *Attorney, Agent, or Firm* — Schwabe Williamson & Wyatt, P.C.

(57) ABSTRACT

Embodiments herein provide a test apparatus and system for a millimeter wave reflection test to measure propagation of millimeter wave signal through a material at various incident angles. In one example, the test apparatus may include a mechanized arch over a base plate, the mechanized arch including antenna carriers coupled to the mechanized arch and configured to hold respective antennas. A motor assembly moves the antenna carriers along the mechanized arch while maintaining the antenna carriers at symmetrical (equal and opposite) angles with respect to the base plate.

20 Claims, 7 Drawing Sheets

MILLIMETER WAVE REFLECTION TEST APPARATUS

CROSS REFERENCE TO RELATED APPLICATION

This application claims the priority benefit of the earlier filing date of U.S. Provisional Application No. 62/907,134, filed Sep. 27, 2019, which is hereby incorporated by reference in its entirety.

TECHNICAL FIELD

Embodiments herein relate to the field of measurement instruments, and, more specifically, to a test apparatus for a millimeter wave reflection test.

BACKGROUND

A number of industries are using and/or developing systems that use millimeter wave (mmWave) frequencies. For example, 5G new radio cellular networks (e.g., using 24 gigahertz (GHz), 28 GHz, and 39 GHz) and Automotive with Advance Anticollision Radar (e.g., using 77 GHz and 81 GHz), are using mmWave frequencies. mmWave signals between 18 GHz and 95 GHz present propagation challenges that are not necessarily prominent at lower frequencies.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
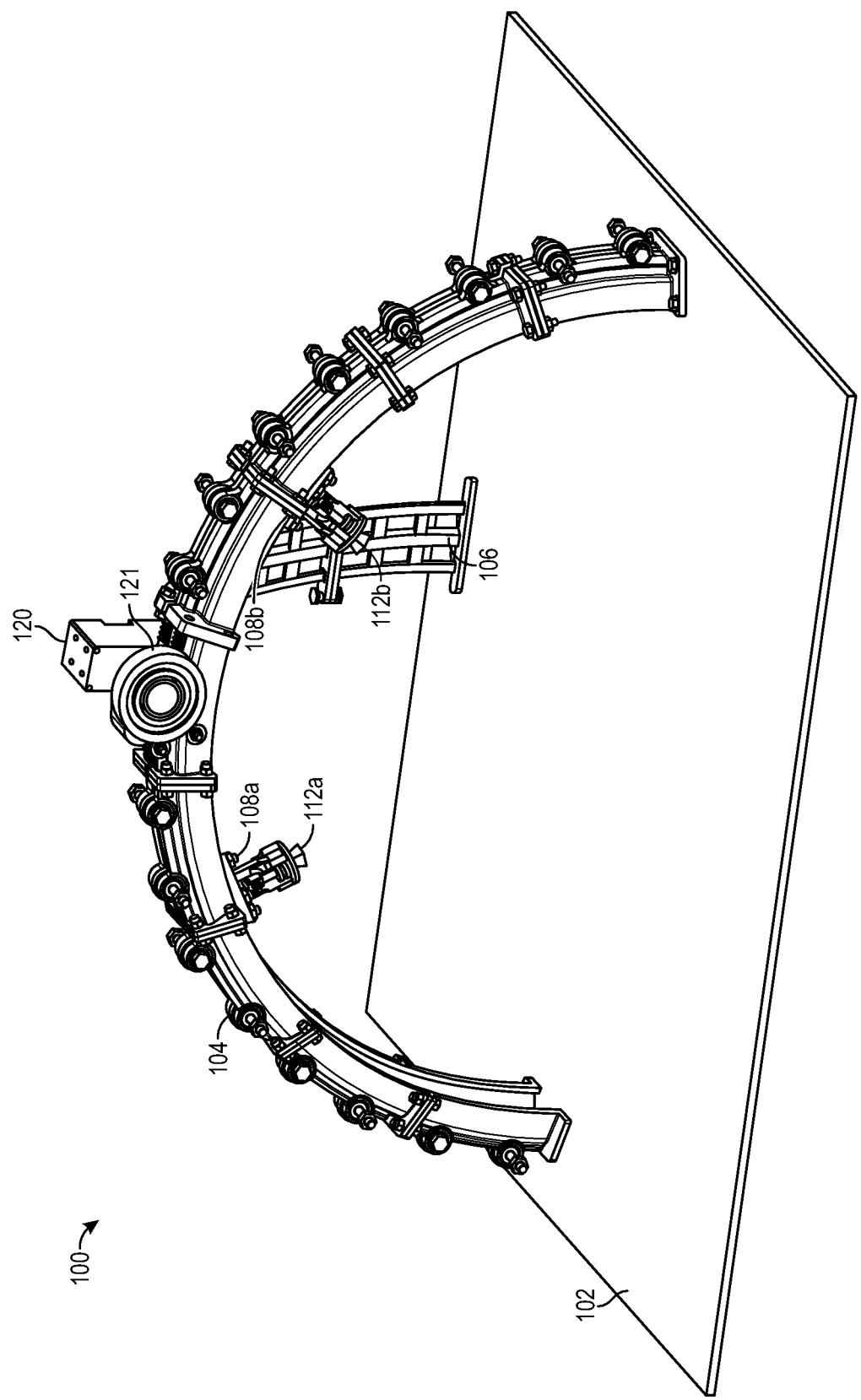
FIG. 1 illustrates a test apparatus for a millimeter wave reflection test in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide a test apparatus and system for a millimeter wave reflection test to measure propagation of millimeter wave signal through a material at various incident angles. The test apparatus may also be referred to as a millimeter wave reflection meter. In various embodiments, the test apparatus may include a mechanical arch that extends above a base plate. A pair of antenna carriers may be coupled to the mechanical arch on opposite sides of the top of the arch. The test apparatus may include a motor assembly that moves the antenna carriers along the arch. The motor assembly may additionally maintain the antenna carriers at the equal and opposite angle with respect to the base plate (e.g., when one antenna carrier is at +20 degrees from vertical, the other antenna carrier is at −20 degrees from vertical, etc.). This symmetrical position of the antenna carriers may be maintained mechanically. For example, the same motor and gears may move both antenna carriers, thereby mechanically locking them to be at symmetrical angles. These features simplify the design and complexity of the test apparatus while also ensuring that the antenna assemblies are at the same angle for useful results in the millimeter wave reflection test.

A material under test (MUT) may be placed on the base plate (e.g., the center of the base plate). Additionally, an antenna may be coupled to each antenna carrier, for example via an antenna holder coupled to the antenna carrier. The antenna holders coupled to each antenna carrier may be integral to their respective antenna carrier in some examples. In other examples, the antenna holders may be removably coupled to their respective antenna carrier. One antenna transmit a test signal (also referred to as a measurement signal) toward the center of the base plate. The other antenna may receive the reflected signal that arrives at the other antenna. The received signal may be measured and/or analyzed to determine the signal propagation properties of the MUT. In some embodiments, a first set of measurements may be obtained without the MUT and at a plurality of angles of the antenna carriers. The first set of measurements may be used to calibrate the system. A second set of measurements may also be obtained with the MUT positioned on the base plate. The second set of measurements may be compared with the first set of measurements to obtain relative measurements that indicate the signal propagation properties of the MUT at a corresponding frequency and angle of incidence.

The MUT may generally be a MUT that is to be used or considered for use in a wireless communication device, such as a millimeter wave wireless communication device. For example, the MUT may be used in the housing of the device or another component that may be in the propagation path of transmitted and/or received signals of the device. The test apparatus and system described herein may be used with a wide variety of MUTs, such as, but not limited to, materials used in construction, such as wood (e.g., plywood), sheetrock, glass, materials used in automotive applications, such as rubber, plastic (e.g., plastic foam), and/or materials used in electronic devices, such as polymers/plastic (e.g., acrylonitrile butadiene styrene (ABS), polycarbonate (PC), polylactic acid (PLA), and/or low density polyethylene (LDPE), etc.

The test apparatus and system described herein may be particularly useful for millimeter wave communication devices, such as devices that communicate using a frequency between 18 GHz and 95 GHz. Example millimeter wave communication protocols include 3GPP fifth generation (5G) new radio (NR) wireless cellular networks and/or Automotive with Advance Anticollision Radar, among others. In some embodiments, the test apparatus and/or system described herein may be used with other frequencies and/or communication protocols, including frequencies outside of millimeter wave.

Figure 2:
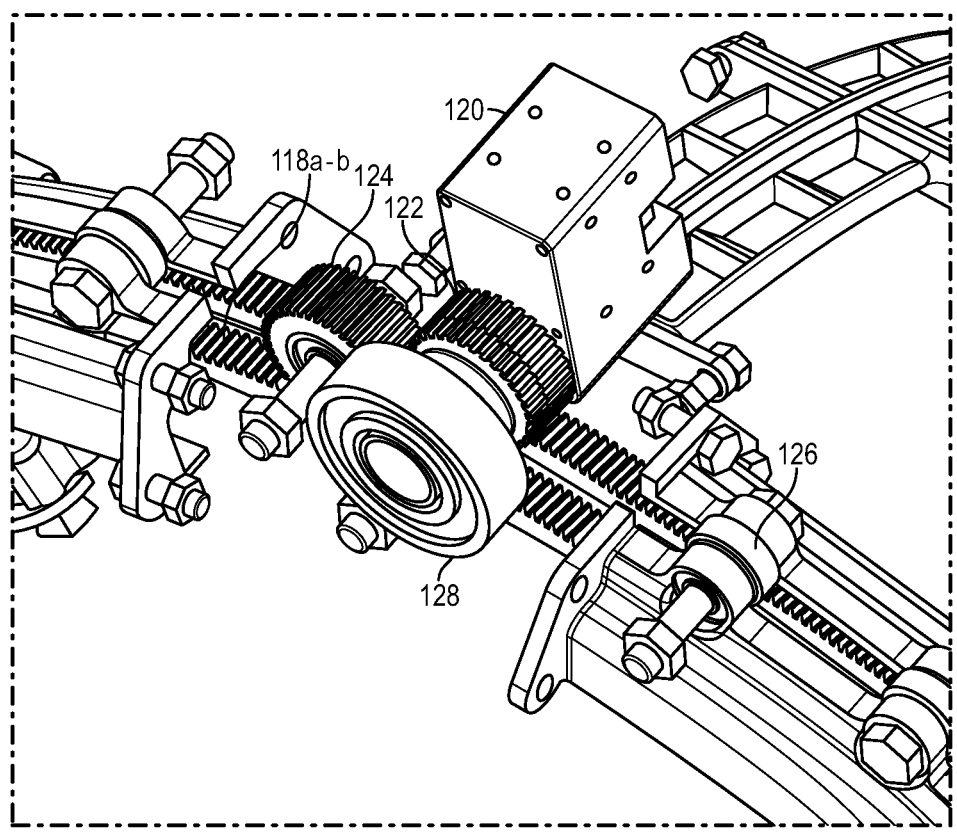
FIG. 2 illustrates another view of a portion of the test apparatus of FIG. 1, in accordance with various embodiments.
Figure 3:
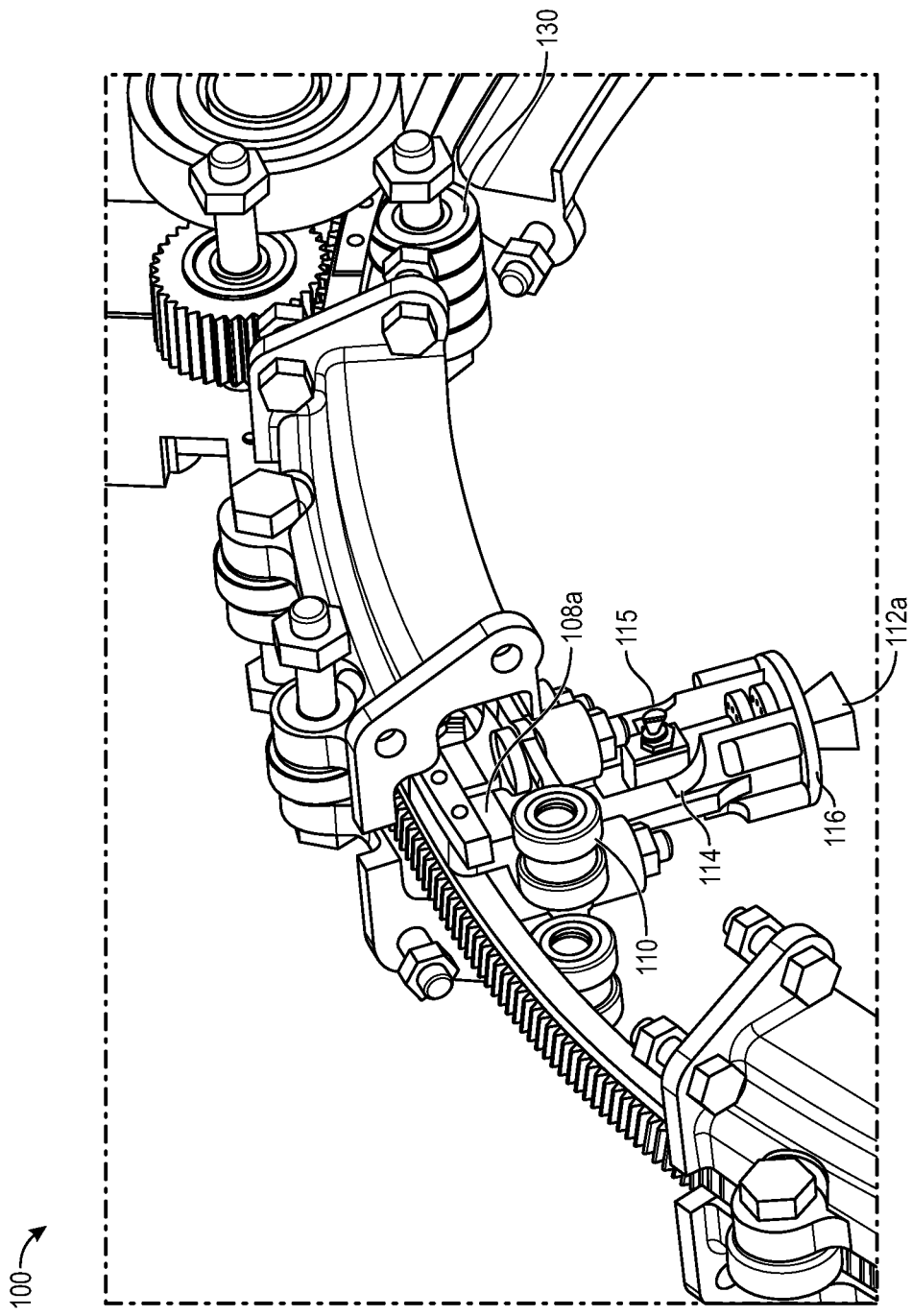
FIG. 3 illustrates yet another view of another portion of the test apparatus of FIG. 1, in accordance with various embodiments.
Figure 4:
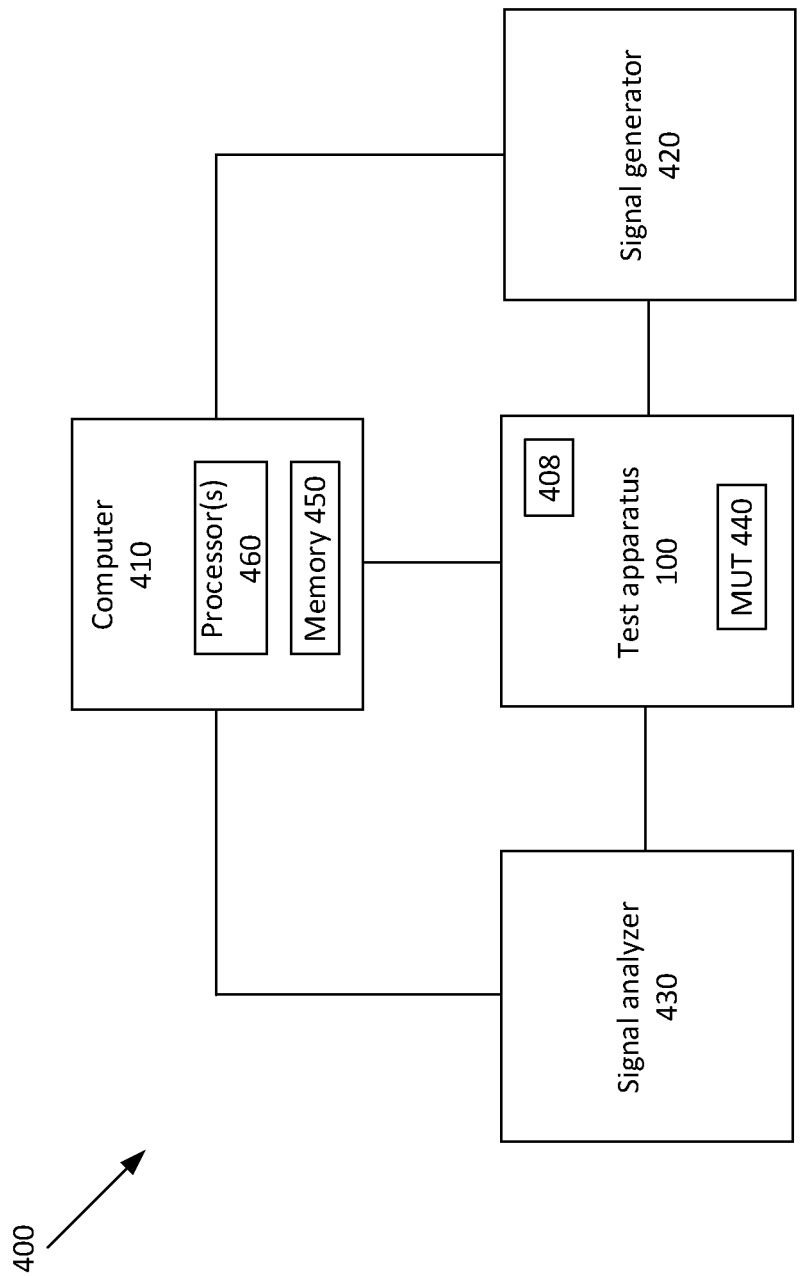
FIG. 4 schematically illustrates a system that includes a test apparatus for use to practice various embodiments.
Figure 5:
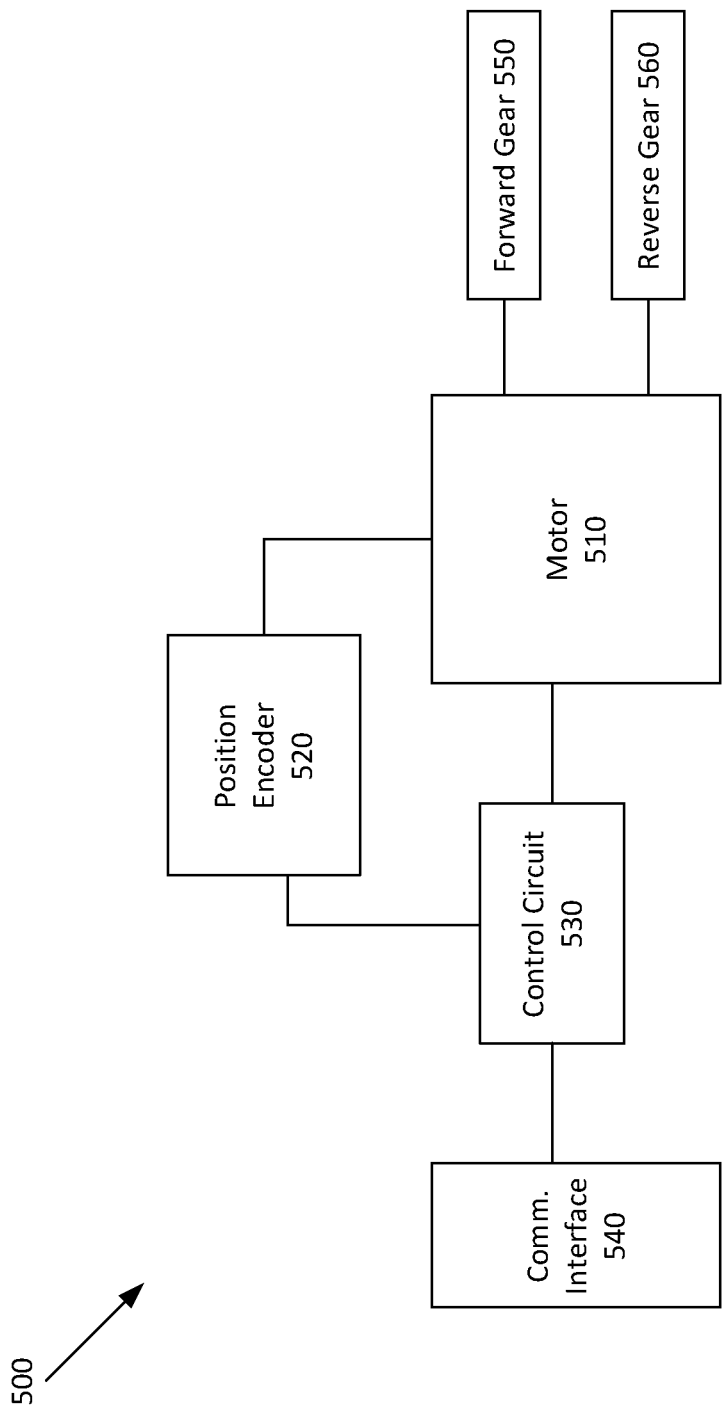
FIG. 5 schematically illustrates a motor assembly that may be included in a test apparatus, in accordance with various embodiments.
Figure 6:
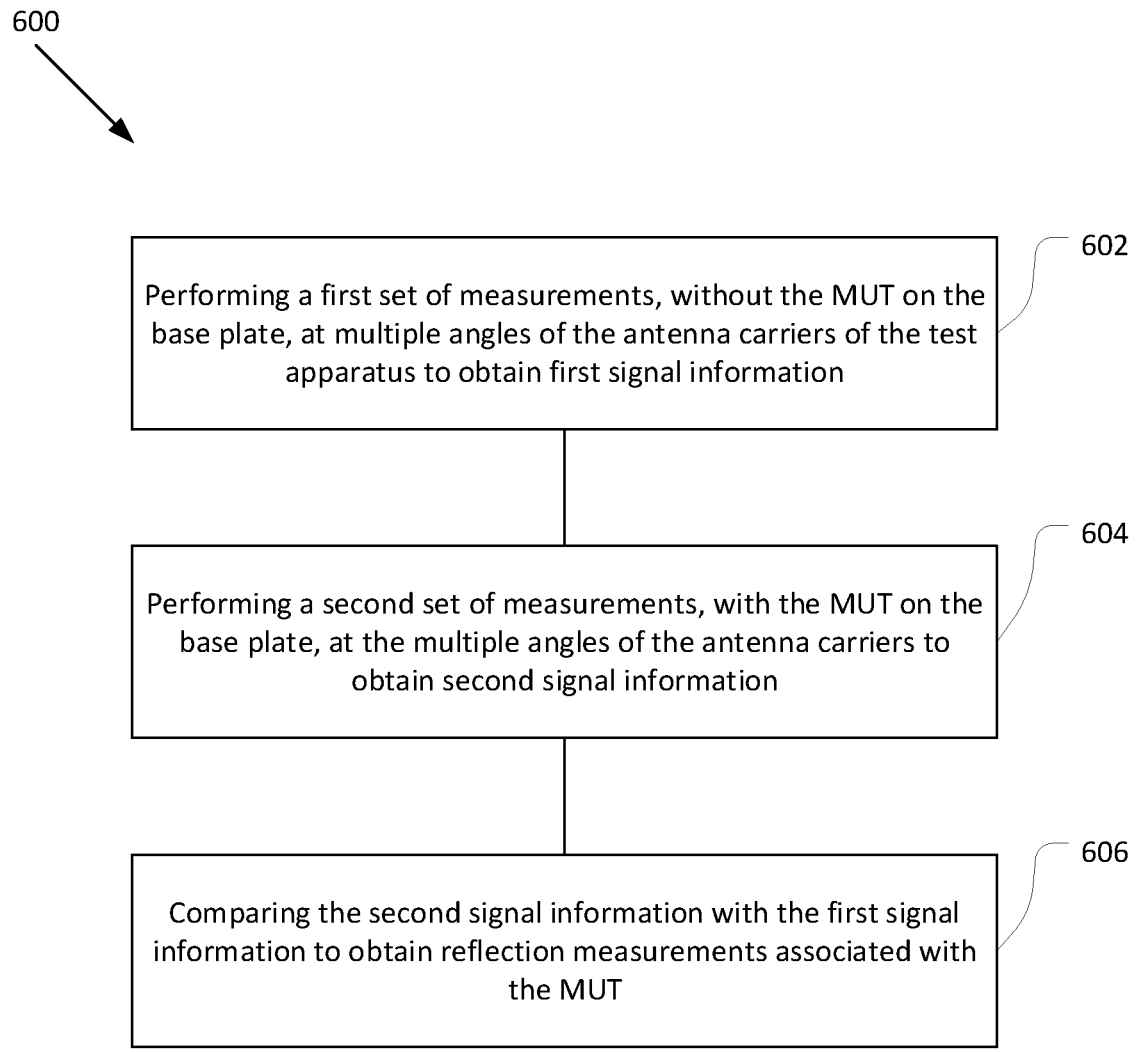
FIG. 6 is a flowchart of an example millimeter wave reflection test that may be performed by a test apparatus and/or system described herein, in accordance with various embodiments.
Figure 7:
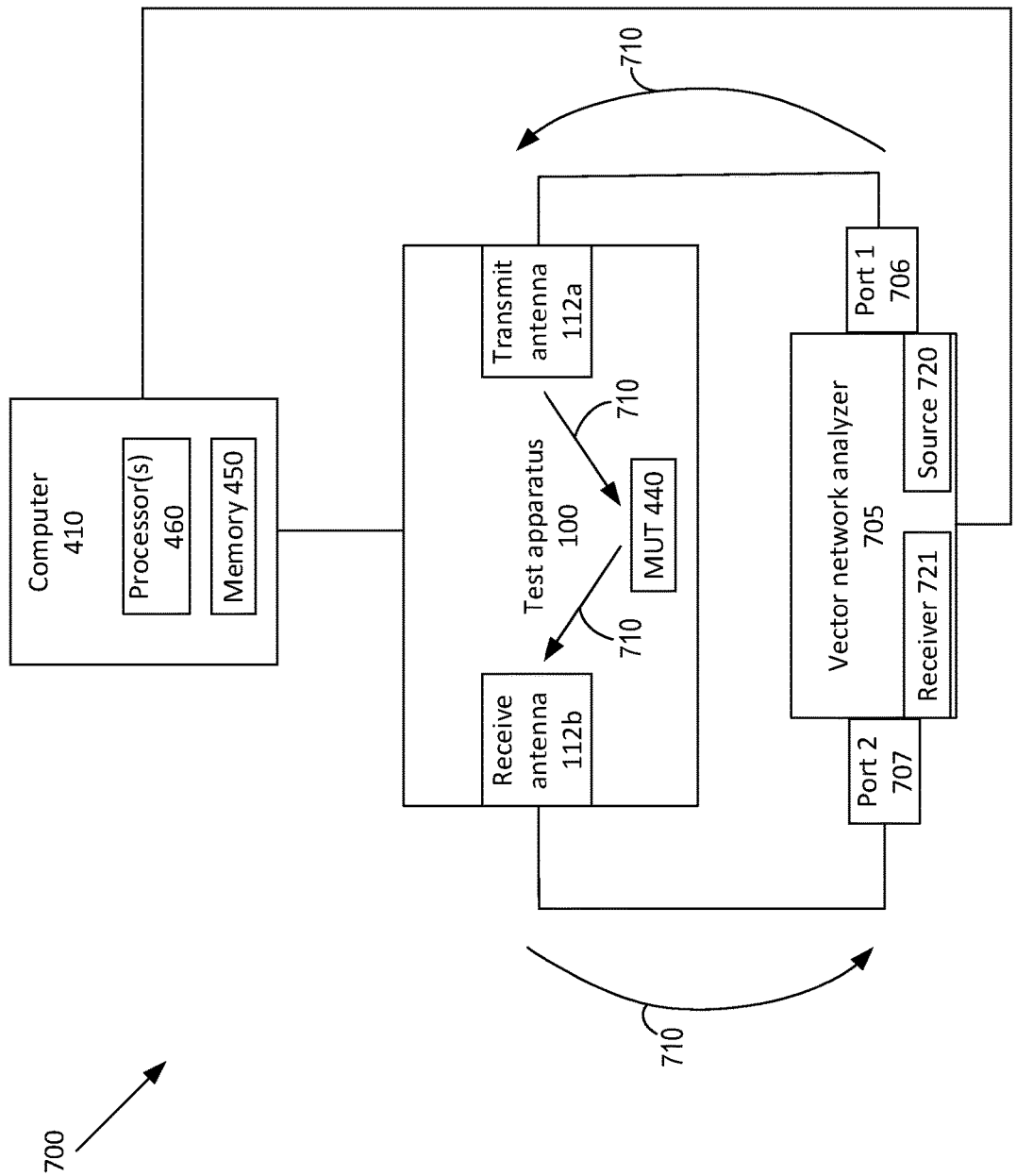
FIG. 7 schematically illustrates a system that includes a test apparatus communicatively coupled to a Vector Network Analyzer (VNA), for use to practice various embodiments.

FIG. 1 illustrates a test apparatus 100 in accordance with various embodiments. FIG. 2 and FIG. 3 show additional views of portions of the test apparatus 100. Additionally, FIG. 4 illustrates a system 400 that includes the test apparatus 100 in accordance with various embodiments. The system 400 may further include a computer 410, a signal generator 420, and/or a signal analyzer 430 coupled to the test apparatus 100, as further discussed below. The test apparatus 100 and/or system 400 may perform a millimeter wave reflection test on a material under test (MUT, such as MUT 440 depicted in FIG. 4). FIG. 5 depicts a motor assembly 500 for use with test apparatus 100. A high-level example method 600 for a millimeter wave reflection test using test apparatus 11 and/or systems of the present disclosure, is depicted at FIG. 6. Another example system 700 that includes the test apparatus 100, computer 400 and a VNA 705, is depicted at FIG. 7.

In various embodiments, the test apparatus 100 may include a base plate 102 to support the MUT (e.g., MUT 440). The MUT may be placed, for example, in the center of the base plate 102. In some embodiments, the base plate 102 may be made of a fully reflective material (e.g., metal). As discussed herein, a fully reflective material may comprise material that reflects 95-100% of a microwave signal, for example a millimeter microwave signal. A mechanized arch 104 may be coupled to the base plate 102. The mechanized arch 104 may form a half circle that extends over the base plate (e.g., centered on the base plate). In some embodiments, a support structure 106 may be coupled to the mechanized arch 104 and the base plate 102. Support structure 106 may be perpendicular to mechanized arch 104 in some examples, however in other examples support structure may angularly extend from mechanized arch 104 without departing from the scope of this disclosure.

The base plate 102 and/or mechanized arch 104 may be any suitable size. In some embodiments, the base plate 102 and/or mechanized arch 104 may be sized to fit on a work bench. For example, the base plate 102 may be 1 square foot (0.0929 square meters) to 16 square feet (1.487 square meters), such as 4 square feet (e.g., 2 feet by 2 feet), although other sizes are also contemplated depending on the application.

In various embodiments, the test apparatus 100 may further include two antenna carriers 108a and 108b coupled to the mechanized arch 104. The antenna carriers 108a-b may be configured to move along the mechanized arch 104. For example, the antenna carriers 108a-b may include ball bearings 110 that are coupled to rails of the mechanized arch 104 to move the antenna carriers 108a-b along the mechanized arch 104.

The antenna carriers 108a-b may be configured to have respective antennas 112a and 112b coupled thereto. For example, in some embodiments, the test apparatus 100 may include an antenna holder 114 coupled to each antenna carrier 108a-b to hold the respective antenna 112a-b. In some embodiments, the antenna holder 114 may be removably coupled to the respective antenna carrier 108a-b, e.g., at one or more mounting points, such as via bolts, pins, locks, fasteners, and/or screws, and the like. For example, the antenna carriers 108a-b may be configured to accommodate different sizes/designs of antenna holder 114, thereby enabling different sizes/types of antennas 112a-b to be used with the test apparatus 100. Alternatively, the antenna holder 114 may be integrated with the antenna carrier 108a and/or 108b in some embodiments. A clamp 116 or similar device (e.g., clasp, fastener, etc.) may secure the antenna 112a-b to the respective antenna holder 114.

The antennas 112a-b may transmit and/or receive millimeter wave signals. In some embodiments, the antennas 112a-b may transmit and/or receive a directional beam signal (e.g., as used in beamforming). For example, the antennas 112a-b may be horn antennas, although other suitable types of antennas 112a-b may also be used. Types of horn antennas relevant to the present disclosure include but are not limited to flared rectangular, finned, flared conical, corrugated conical, compound flared, segmented aperture, and the like. In some embodiments, the one or more of the antennas 112a-b may be an antenna array that includes multiple antenna elements to transmit and/or receive a directional beam signal.

During performance of the millimeter wave reflection test, one antenna (e.g., antenna 112a) may transmit a millimeter wave test signal while the other antenna (e.g., antenna 112b) may receive the signal. The antennas 112a-b may include a control port 115 (e.g., a coaxial port or another suitable type of port) to enable transmission and/or reception of the test signal. For example, the transmit antenna 112a may be coupled to a signal generator (e.g., signal generator 420 of FIG. 4) via its control port 115. In another example, each of the transmit antenna 112a and receive antenna 112b may be communicably coupled to a VNA (e.g., VNA 705 of FIG. 7) via respective control port(s) 115. While not explicitly illustrated at FIG. 7, it may be understood that VNA 705 includes an integral signal generator. The signal generator(s) of the present disclosure may generate a carrier wave at the measurement frequency, in embodiments. In some embodiments, the signal generator may sweep through a predetermined set of millimeter wave frequencies (e.g., across a frequency span). In some embodiments, the signal generator may be a continuous width signal generator.

The receive antenna 112b may in some examples be coupled to a signal analyzer (e.g., signal analyzer 430 of FIG. 4) to measure and/or analyze the signal received by the receive antenna 112b (e.g., as reflected off of the MUT and/or base plate 102). For example, in some embodiments, the signal analyzer may include a spectrum analyzer (e.g., capable of measuring a power of a spectrum of known and/or unknown signals) and/or a power meter. In some embodiments, the signal generator 420 and/or signal analyzer 430 may be separate devices from the computer 410. In other embodiments, a single device may perform one or more functions of the computer 410 and one or more functions of the signal generator 420 and/or signal analyzer 430 described herein. As mentioned above and which is further elaborated below, in some examples a VNA (e.g., VNA 705 of FIG. 7) may be capable of both signal generation and analysis.

The antenna carriers 108a-b may be coupled to respective cremailleres 118a-b (rack and pinion structure) on the mechanized arch 104. Cremailleres 118a-b are also referred to herein simply as racks 118a-b. In some embodiments, the antenna carriers 108a-b may be coupled to different cremailleres 118a-b which may, for example, extend for ¼ of a circle. The test apparatus 100 may further include a motor assembly 120 that includes a motor and one or more gears to drive the antenna carriers along the mechanized arch 104 using the cremailleres 118a-b. For example, the motor assembly 120 may include a forward gear 122 and a reverse gear 124 to drive the antenna carriers 108a-b in different directions along the mechanized arch 104. In some embodiments, the motor may directly drive the gears. In some embodiments, the motor assembly 120 may be coupled at the top (e.g., center) of the mechanized arch 104, e.g., at a motor mount 121 of the mechanized arch 104.

In various embodiments, the antenna carriers 108a-b may be symmetrically located on the mechanized arch 104. That is, the antenna carriers 108a-b may be located at the equal and opposite angle relative to the base plate 102. Additionally, the motor assembly 120 may move the antenna carriers 108a-b symmetrically along the mechanized arch 104, so that the antenna carriers 108a-b (and, by extension, the antennas 112a-b) are always at the same angle relative to the base plate 102 as the antenna carriers 108a-b move. The symmetric alignment of the antenna carriers 108a-b may be maintained mechanically. For example, the same motor assembly 120 and gears 122 and 124 may move both of the antenna carriers 108a-b in tandem, ensuring that the symmetrical position of the antenna carriers 108a-b is locked in place (e.g., with some tolerance).

In some embodiments, the test apparatus 100 may further include cremaillere guide bearings 126 coupled to the mechanized arch 104 at respective locations along the mechanized arch 104, a front bearing 128 coupled to the mechanized arch 104 opposite the motor assembly 120 (e.g., with the forward gear 122 between the motor assembly 120 and the front bearing 128, and/or a cremalliere lower roller 130 coupled across the cremallieres 118a-b on the bottom side of the top of the mechanized arch 104 (e.g., underneath the forward gear 122, motor assembly 120, and/or front bearing 128). The cremaillere guide bearings 126, front bearing 128, and/or cremalliere lower roller 130 may, for example, ensure that the cremailleres 118a-b are tightly coupled with the driving gears (e.g., forward gear 122 and reverse gear 124), limit the friction of the cremaillere 118a-b with the guide rails of the mechanized arch 104, and/or maintain the position of antenna carriers 108a-b/antennas 112a-b along the mechanized arch 104 at constant radius from the measurement point and between the antenna carriers 108a-b/antennas 112a-b (e.g., prevent up and down play/movement along the mechanized arch 104).

In some embodiments, the motor assembly 120 may be a smart actuator, such as the smart actuator 500 shown in FIG. 5. The smart actuator 500 may include a motor 510, a position encoder 520 (e.g., absolute position encoder, or incremental position encoder) and a control circuit 530 (e.g., microcontroller). In some embodiments, the motor 510, position encoder 520, and control circuit 530 may all be included in a single housing. The motor 510 may be coupled to a forward gear 550 (e.g., same as forward gear 122 of FIG. 2) and a reverse gear 560 (e.g., same as reverse gear 124 of FIG. 2).

The smart actuator 500 may further include a communications interface 540 to interface with a computer (e.g., computer 410 of FIG. 4) to perform the millimeter wave reflection test. In some embodiments, the communications interface 540 may be a wired interface, which may prevent interference with the millimeter wave reflection test. For example, the communications interface 540 may include a transistor-transistor logic (TTL) interface, an RS485 interface, and/or a Universal Serial Bus (USB) interface, such as a USB to TTL/RS485 converter. In other embodiments, the communications interface 540 may be a wireless communication interface that uses a frequency outside of the frequency range to be tested (e.g., a frequency that is less than millimeter wave). It will be apparent that other suitable communications protocols may be used for the communications interface 540.

The position encoder 520 may provide feedback to the computer via the communications interface 540 to indicate the position of the antenna carriers 108a-b/antennas 112a-b on the mechanized arch 104 (e.g., based on the rotational position of the motor 510 and/or gears 550 and/or 560). In some embodiments, the position encoder may have an accuracy of 12 bits per revolution (e.g., of the motor 510 and/or gears 550 and/or 560) or higher. The positional encoder may enable a resolution for the position of the antenna carriers 108a-b/antennas 112a-b of less than one degree.

The motor 510 may be an electric motor, such as a direct current (DC) motor (e.g., a 12V motor or another suitable voltage). The power supply may be provided via an alternating current (AC)-to-DC converter plugged in to an AC power supply (e.g., a power outlet).

In various embodiments, the test apparatus 100 may perform a millimeter wave reflection test. In some embodiments, the test apparatus 100 may be controlled by the computer (e.g., computer 410 of FIG. 4) to perform the millimeter wave reflection test. For example, the computer 410 may include a memory 450 and one or more processors 460 coupled to the memory 450. The memory 450 may include instructions, stored thereon, that when executed by the one or more processors 460, cause the system 400 to perform the millimeter wave reflection test. The memory 450 may include any suitable type of memory, including non-transitory computer-readable memory such as a hard disk drive (HDD), solid state drive (SDD, such as flash memory), etc. The one or more processors 460 may include any suitable processors, such as a general purpose central processing unit (CPU) and/or a custom processor that is designed to implement the millimeter wave reflection test.

The instructions stored on the memory 450 may be provided in any suitable form. For example, in some embodiments, the instructions may be provided in source code under Apache (e.g., free and open-source cross-platform web server software) or similar license scheme to allow users to make improvement and customization without royalties but under free license. Some embodiments may use the Python code language, however any suitable code language may be used, such as Matlab and/or Labview, among others.

In various embodiments, the instructions may enable a set of commands to drive the position of the antenna carriers 108a-b. For example, a "move_to_position (angle)" command may move the antenna carriers 108a-b to a specified angle with respect to the base plate 102. A "plot (step_size_in_degree)" command may move the antenna carriers 108a-b along the mechanized arch 104 sequentially with a specified step size, and may in some examples obtain reflection measurements at each step along the path. The obtained reflection measurements may be plotted, e.g., in graphical and/or tabular form. In some embodiments, the "plot (step_size_in_degrees)" command may further specify a starting angle and finishing angle for the obtained data and/or plot.

Additional example commands that may be performed as part of the millimeter wave reflection test may include, but are not limited to, a "park_antenna( )" command (e.g., move the antenna carriers 108a-b to a specified angle, for example to be out of the way to place the MUT and/or to be in a safe place for moving the test apparatus 100) and/or a "search_range( )" command (e.g., to search a specified range of angles for a peak response, such as highest or lowest received power).

As discussed above, as part of the millimeter wave reflection test, in some examples the signal generator 420 may generate a carrier wave at the measurement frequency for transmission by the transmit antenna (e.g., antenna 112a). The carrier wave may be generated with a predefined power level and/or power spectrum over a frequency range. The characteristics of the measurement frequency (e.g., frequency range, power level, etc.) may be adjustable by a user of the system 400.

The receive antenna (e.g., antenna 112b) may receive the reflected signal (e.g., reflected off of the MUT and/or base plate 102) and measure and/or analyze the received signal. In an embodiment, the system 400 may transmit and receive signals at several different angles of the antennas 112a-b with respect to the base plate 102 (e.g., with a specified step size between angles). At each step, the signal analyzer 430 may measure the signal information (e.g., power level at a given frequency) and store the signal information and associated angle position of the antennas 112a-b.

FIG. 6 is a flowchart that illustrates an example millimeter wave reflection test 600 in accordance with some embodiments. Some or all aspects of the millimeter wave reflection test 600 may be performed by the test apparatus 100 (e.g., including smart actuator 500) and/or system 400, or system 700 (discussed below).

At 602, the millimeter wave reflection test 600 may include performing a first set of measurements, without the MUT on the base plate (e.g., base plate 102), at multiple angles of the antenna carriers of the test apparatus (e.g., test apparatus 100). The first set of measurements may be obtained to calibrate the measurement system (e.g., system 400). During the calibration, the transmit antenna of the test apparatus (e.g., antenna 112a) may transmit a measurement signal that is received by the receive antenna (e.g., antenna 112b) after reflection off of the base plate 102. The system may collect first signal information (e.g., an attribute of the signal including but not limited to frequency, amplitude, phase, and/or power) for the signal received from the receive antenna (e.g., using the signal generator 420, or a signal generator part of VNA 705). The test apparatus 100 may move the antenna carriers 108a-b (and by extension the antennas 112a-b) along the mechanized arch 104, and repeat the transmission and reception of the measurement signal to obtain signal information at different angles of the antenna carriers 108a-b (and antennas 112a-b) with respect to the base plate 102.

At 604, the millimeter wave reflection test 600 may further include performing a second set of measurements with the MUT on the base plate (e.g., in the center of the base plate 102) at the multiple angles of the antenna carriers. Similar to the first set of measurements, the system may collect second signal information for the signal received from the receive antenna at multiple angles of the antenna carriers 108a-b (and antennas 112a-b).

At 606, the millimeter wave reflection test 600 may include comparing the second signal information from the second measurement to the first signal information from the first measurement to obtain reflection measurements associated with the MUT. For example, the comparison may include determining a power difference (e.g., in decibels (dB)) between the second signal information and the first signal information at each incident angle of the antennas 112a-b with respect to the base plate 102. In some embodiments, the system may generate a plot of the results, e.g., in a graph and/or a table, that shows the relative power level on the Y axis and the incident angle of the signal on the X axis. This plot depicts the signal reflection level of the MUT at a given frequency.

The plot may be stored in a unique file (e.g., on the computer 410) in graphical and/or tabular form for post-processing and/or later rendering. In some embodiments, the computer 410 may display the rendered curve on a real time plot such that the user can monitor the progress of the millimeter wave reflection test as it is performed.

In some embodiments, the system may perform the millimeter wave reflection test 600 at one signal frequency. In other embodiments, the system may perform the millimeter wave reflection test 600 at multiple frequencies. For example, the measurement signal may include a defined power spectrum over one or more frequency ranges and/or the measurements may be repeated with separate measurement signals at different frequencies. The system may generate a three-dimensional (3D) plot of the results, e.g., with relative signal power on the Y axis, the incident angle on the X axis, and frequency on the Z axis.

In some embodiments, the support structure 106 of the test apparatus 100 may provide a channel for one or more cables, such as a cable between the motor assembly 120 and the computer (e.g., connected to communication interface 540), one or more power supply cables, a cable that connects the antenna 112a to the signal generator 420 (or to VNA 705 by way of a first VNA port 706), and/or a cable that connects the antenna 112b to the signal analyzer 430 (or to VNA 705 by way of a second VNA port 707).

In some embodiments, the support structure 106 may include a cable management feature 408 (refer to FIG. 4) to hold the cables (e.g., coaxial cables) that are connected to the antenna 112a and/or 112b while the antenna carriers 108a-b move along the mechanized arch 104, such that the cables do not interfere with the measurements. For example, the cable management feature may include one or more elastic bands (e.g., bands comprised of one or more elastomers) coupled to the support structure 106 to pull the respective cable along the support structure 106 while the antenna carrier 108a-b gets closer to the top/center of the mechanized arch 104 and expand as the antenna carrier 108a-b moves further away from the top/center of the mechanized arch 104.

In various embodiments, the test apparatus 100 may be manufactured from any suitable materials. In some embodiments, one or more of the bearings may be 608ZZ, 606ZZ, and/or 6205RS2 bearings. The frame for the mechanized arch 104 and/or support structure 106 may include, for example, a polymer such as polylactic acid (PLA). PLA has several characteristics that provide benefits for the test apparatus 100. For example, PLA has good rigidity, enables relatively easy production with an additive manufacturing process, is economical, is made from a plant-based organic resin (and is recyclable), enables customization and design improvements to be made, and has a low dielectric constant to limit stray reflections of the measurement signals. Other bioplastics that can be used for the frame of mechanized arch 104 include but are not limited to other aliphatic polyesters (e.g., poly-3-hydroxybutyrate), polyhydroxyalkanoates (PHA), polyhydroxyurethanes, cellulose or starch-based bioplastics, or the like.

In some embodiments, the test apparatus described herein may be manufactured in such a way that it may be shipped in a low-profile package and easily assembled by end users, which may be advantageous in that shipping costs may be reduced and the test apparatus may be readily assembled and disassembled by a user to enable ease of transport.

Turning now to FIG. 7, depicted is an example embodiment of another system 700 of the present disclosure. System 700, similar to system 400 at FIG. 4, includes test apparatus 100 and computer 400. System 700 differs from system 400 in that signal generator 420 and signal analyzer 430 are replaced by a vector network analyzer (VNA) 705, although it may be understood that signal analysis componentry and signal generation componentry may be integral to VNA 705. For example, broadly speaking, VNA 705 includes at least a source 720 (e.g., incorporated signal generator capable of generating a millimeter wave stimulus signal) and one or more receivers 721, used to determine changes to the stimulus signal caused via the MUT 440. More specifically, VNAs, such as VNA 705, measure a filter response across a frequency span. With regard to the present disclosure, the filter may be understood to comprise the MUT 440. Operationally, as depicted at FIG. 7, a first VNA port 706 may be communicably coupled to transmit antenna 112a, and a second VNA port 707 may be communicably coupled to receive antenna 112b, of test apparatus 100. S21 measurements may then provide a full spectrum frequency response at each angular position of antennas 112a-b.

Scattering parameters (S-parameters) as discussed herein in general refer to a scattering matrix of a microwave network that shows reflection/transmission characteristics (e.g., amplitude/phase) in the frequency domain. Numbering convention for S-parameters is that the first number following the "S" corresponds to the port where the signal emerges from the filter (e.g., port 2) and the second number corresponds to the port where the signal is applied (e.g., port 1). Accordingly, an S21 measurement as discussed herein corresponds to a measure of the signal emerging from the MUT 440 as received by receive antenna 112b and returning to VNA 705 by way of second port 707, and wherein the signal is applied by way of first port 706 and transmitted to the MUT 440 by way of transmit antenna 112a. For reference, signal transmission/reception flow for an S21 measurement as herein disclosed in conjunction with test apparatus 100 is shown illustratively by arrows 710. Advantages to combining test apparatus 100 with VNA 705 includes but is not limited to enabling a determination of full spectrum frequency response at any number of angular positions of antennas 112a-b.

Thus, discussed herein are methods, apparatus, and systems for measuring propagation of a millimeter wave signal through a test material. In one example, an apparatus for measuring propagation of a millimeter wave signal through a test material comprises a mechanized arch coupled to a base plate, and a first antenna carrier and a second antenna carrier coupled to the mechanized arch. The apparatus may further comprise a first antenna holder coupled to the first antenna carrier and a second antenna holder coupled to the second antenna carrier, the first antenna holder configured to hold a transmit antenna that transmits the millimeter wave signal and the second antenna holder configured to hold a receive antenna that receives the millimeter wave signal.

In a first example of the apparatus, the base plate may be comprised of a material that is fully reflective of the millimeter wave signal, and the base plate may comprise a support for the test material.

A second example of the apparatus optionally includes the first example, and further includes wherein the first antenna holder and the second antenna holder are integral to the first antenna carrier and the second antenna carrier, respectively.

A third example of the apparatus optionally includes the first example, and further includes wherein the first antenna holder and the second antenna holder are removably coupled to the first antenna carrier and the second antenna carrier, respectively.

A fourth example of the apparatus optionally includes any one or more or each of the first through third examples, and further includes wherein the mechanized arch further comprises one or more drivable racks, and wherein the first antenna carrier and the second antenna carrier are coupled to the mechanized arch via the one or more drivable racks.

A fifth example of the apparatus optionally includes any one or more or each of the first through fourth examples, and further comprises a motor assembly comprising a motor and one or more gears coupled to the motor to drive the one or more drivable racks and, in turn, drive the first antenna carrier and the second antenna carrier along a length of the mechanized arch. In such an example, the motor assembly maintains the first antenna carrier and the second antenna carrier at equal and opposite angles with respect to the base plate and a vertical axis of the mechanized arch.

A sixth example of the apparatus optionally includes any one or more or each of the first through fifth examples, and further includes wherein the one or more gears further comprise a forward gear and a reverse gear to drive the first antenna carrier and the second antenna carrier in different directions along the length of the mechanized arch.

A seventh example of the apparatus optionally includes any one or more or each of the first through sixth examples, and further includes wherein the motor assembly further comprises a position encoder and a communications interface to indicate a position of the first antenna carrier and the second antenna carrier based on a rotational position of one or more of the motor and the one or more gears.

An eighth example of the apparatus optionally includes any one or more or each of the first through seventh examples, and further comprises a support structure coupled to the mechanized arch and the base plate, the support structure including one or more channels configured to receive one or more cables that connect to one or more of the motor assembly, the first transmit antenna and the second receive antenna.

In another embodiment, a method for measuring propagation of a millimeter wave signal through a test material comprises 1) in an absence of the test material, transmitting the millimeter wave signal via a transmit antenna and measuring one or more attributes of the millimeter wave signal received via a receive antenna following reflection of the millimeter wave signal off a base plate, to obtain a first set of one or more calibration measurements, 2) in a presence of the test material placed on the base plate, transmitting the millimeter wave signal via the transmit antenna and measuring the one or more attributes of the millimeter wave signal received via the receive antenna following reflection of the millimeter wave signal, to obtain a second set of one or more test measurements, and 3) comparing the first set of calibration measurements to the second set of test measurements to obtain a signal reflection level of the test material.

In a first example of the method, the method further comprises positioning the transmit antenna and the receive antenna at one or more different incident angles with respect to the base plate, to obtain one or more measurements corresponding to the first set of one or more calibration measurements and/or the second set of one or more test measurements. In such an example, positioning the transmit antenna and the receive antenna includes operating a motor to drive one or more gears coupled between the motor and at least one of the transmit antenna and the receive antenna to move the transmit antenna and receive antenna along a mechanized arch such that the transmit antenna and receive antenna are maintained at equal and opposite angles with respect to the base plate.

A second example of the method includes the first example, and further includes wherein positioning the transmit antenna and the receive antenna further comprises via a position encoder, indicating a first position of a transmit antenna carrier coupled to the transmit antenna by way of a transmit antenna holder, and indicating a second position of a receive antenna carrier coupled to the receive antenna by way of a receive antenna holder, based on one or more of a rotational position of the motor and the one or more gears.

A third example of the method optionally includes any one or more of each of the first through second examples, and further includes wherein comparing the first set to the second set to obtain the signal reflection level of the test material further comprises determining a power difference in decibels (dB) between the first set of one or more calibration measurements and the second set of one or more test measurements, at each of the one or more different incident angles with respect to the base plate.

A fourth example of the method optionally includes any one or more or each of the first through third examples, and further includes wherein comparing the first set to the second set to obtain the signal reflection level of the test material further comprises determining a difference between a first group of one or more scattering parameters (S-parameters) corresponding to the first set of one or more calibration measurements, and a second group of one or more S-parameters corresponding to the second set of one or more test measurements, at each of the one or more different incident angles with respect to the base plate.

A fifth example of the method optionally includes any one or more or each of the first through fourth examples, and further includes wherein the one or more attributes of the millimeter wave signal include one or more of amplitude, frequency, phase and power.

A sixth example of the method optionally includes any one or more or each of the first through fifth examples, and further includes wherein transmitting the millimeter wave signal via the first transmitting antenna further comprises, via a signal generator, generating a carrier wave at a measurement frequency for transmission via the first transmit antenna, wherein the carrier wave is generated at a predefined power level and/or power spectrum.

A seventh example of the method optionally includes any one or more or each of the first through sixth examples, and further includes wherein transmitting the millimeter wave signal via the first transmitting antenna further comprises, via a vector network analyzer, sweeping a frequency of the millimeter wave signal.

In another embodiment a millimeter wave reflection test apparatus, comprises a mechanical arch coupled to and extending above a base plate, a pair of antenna carriers coupled to one or more racks of the mechanical arch on opposite sides of a top of the mechanical arch, a pair of antenna holders that are integral to or removably coupled to the pair of antenna carriers (the pair of antenna holders configured to accept a plurality of different antennas), a motor assembly coupled to the mechanical arch via a motor mount (the motor assembly including a motor coupled to one or more gears to drive the one or more racks to move the pair of antenna carriers along a length of the mechanical arch), and a support structure that couples to the base plate and to a frame of the mechanical arch.

In a first example of the apparatus, the motor coupled to the one or more gears mechanically locks the pair of antenna carriers to be positioned at equal and opposite angles with respect to the base plate.

A second example of the apparatus optionally includes the first example, and further includes wherein the base plate is metal and fully reflective of millimeter waves, and wherein the base plate provides a structure for a material under test via the millimeter wave reflection test apparatus.

A third example of the apparatus optionally includes any one or more or each of the first through second examples, and further includes wherein the support structure further comprises a channel for one or more cables that couple to one or more of the motor assembly and antennas held by the pair of antenna holders, the channel including one or more elastic bands for maintaining the one or more cables in place. In such an example, the one or more elastic bands are coupled to the support structure and contract as the pair of antenna carriers move toward the top of the mechanical arch and expand as the pair of antenna carriers move away from the top of the mechanical arch.

A fourth example of the apparatus optionally includes any one or more or each of the first through third examples, and further includes wherein a positional resolution of each of the pair of antenna carriers is less than one degree.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An apparatus for measuring propagation of a millimeter wave signal through a test material, the apparatus comprising:
   a mechanized arch coupled to a base plate;
   a first antenna carrier and a second antenna carrier coupled to the mechanized arch; and
   a first antenna holder coupled to the first antenna carrier and a second antenna holder coupled to the second antenna carrier, the first antenna holder configured to hold a transmit antenna that transmits the millimeter wave signal and the second antenna holder configured to hold a receive antenna that receives the millimeter wave signal.

2. The apparatus of claim 1, wherein the base plate is comprised of a material that is fully reflective of the millimeter wave signal; and
   wherein the base plate comprises a support for the test material.

3. The apparatus of claim 1, wherein the mechanized arch further comprises one or more drivable racks; and
   wherein the first antenna carrier and the second antenna carrier are coupled to the mechanized arch via the one or more drivable racks.

4. The apparatus of claim 3, further comprising:
   a motor assembly comprising a motor and one or more gears coupled to the motor to drive the one or more drivable racks and, in turn, drive the first antenna carrier and the second antenna carrier along a length of the mechanized arch; and
   wherein the motor assembly maintains the first antenna carrier and the second antenna carrier at equal and opposite angles with respect to the base plate and a vertical axis of the mechanized arch.

5. The apparatus of claim 4, wherein the one or more gears further comprise a forward gear and a reverse gear to drive the first antenna carrier and the second antenna carrier in different directions along the length of the mechanized arch.

6. The apparatus of claim 4, wherein the motor assembly further comprises:
   a position encoder and a communications interface to indicate a position of the first antenna carrier and the second antenna carrier based on a rotational position of one or more of the motor and the one or more gears.

7. The apparatus of claim 4, further comprising:
   a support structure coupled to the mechanized arch and the base plate, the support structure including one or more channels configured to receive one or more cables that connect to one or more of the motor assembly, the first transmit antenna and the second receive antenna.

8. A method for measuring propagation of a millimeter wave signal through a test material, comprising:
   in an absence of the test material, transmitting the millimeter wave signal via a transmit antenna and measuring one or more attributes of the millimeter wave signal received via a receive antenna following reflection of the millimeter wave signal off a base plate, to obtain a first set of one or more calibration measurements;
   in a presence of the test material placed on the base plate, transmitting the millimeter wave signal via the transmit antenna and measuring the one or more attributes of the millimeter wave signal received via the receive antenna following reflection of the millimeter wave signal, to obtain a second set of one or more test measurements; and
   comparing the first set of calibration measurements to the second set of test measurements to obtain a signal reflection level of the test material.

9. The method of claim 8, further comprising:
   positioning the transmit antenna and the receive antenna at one or more different incident angles with respect to the base plate, to obtain one or more measurements corresponding to the first set of one or more calibration measurements and/or the second set of one or more test measurements;
   wherein positioning the transmit antenna and the receive antenna includes operating a motor to drive one or more gears coupled between the motor and at least one of the transmit antenna and the receive antenna to move the transmit antenna and receive antenna along a mechanized arch such that the transmit antenna and receive antenna are maintained at equal and opposite angles with respect to the base plate.

10. The method of claim 9, wherein positioning the transmit antenna and the receive antenna further comprises:
    via a position encoder, indicating a first position of a transmit antenna carrier coupled to the transmit antenna by way of a transmit antenna holder and indicating a second position of a receive antenna carrier coupled to the receive antenna by way of a receive antenna holder, based on one or more of a rotational position of the motor and the one or more gears.

11. The method of claim 9, wherein comparing the first set to the second set to obtain the signal reflection level of the test material further comprises:
    determining a power difference in decibels (dB) between the first set of one or more calibration measurements and the second set of one or more test measurements, at each of the one or more different incident angles with respect to the base plate.

12. The method of claim 9, wherein comparing the first set to the second set to obtain the signal reflection level of the test material further comprises:
    determining a difference between a first group of one or more scattering parameters (S-parameters) corresponding to the first set of one or more calibration measurements and a second group of one or more S-parameters corresponding to the second set of one or more test measurements, at each of the one or more different incident angles with respect to the base plate.

13. The method of claim 8, wherein the one or more attributes of the millimeter wave signal include one or more of amplitude, frequency, phase and power.

14. The method of claim 8, wherein transmitting the millimeter wave signal via the first transmitting antenna further comprises:
    via a signal generator, generating a carrier wave at a measurement frequency for transmission via the first transmit antenna, wherein the carrier wave is generated at a predefined power level and/or power spectrum.

15. The method of claim 8, wherein transmitting the millimeter wave signal via the first transmitting antenna further comprises:
   via a vector network analyzer, sweeping a frequency of the millimeter wave signal.

16. A millimeter wave reflection test apparatus, comprising:
   a mechanical arch coupled to and extending above a base plate;
   a pair of antenna carriers coupled to one or more racks of the mechanical arch on opposite sides of a top of the mechanical arch;
   a pair of antenna holders that are integral to or removably coupled to the pair of antenna carriers, the pair of antenna holders configured to accept a plurality of different antennas;
   a motor assembly coupled to the mechanical arch via a motor mount, the motor assembly including a motor coupled to one or more gears to drive the one or more racks to move the pair of antenna carriers along a length of the mechanical arch; and
   a support structure that couples to the base plate and to a frame of the mechanical arch.

17. The apparatus of claim 16, wherein the motor coupled to the one or more gears mechanically locks the pair of antenna carriers to be positioned at equal and opposite angles with respect to the base plate.

18. The apparatus of claim 16, wherein the base plate is metal and fully reflective of millimeter waves; and
   wherein the base plate provides a structure for a material under test via the millimeter wave reflection test apparatus.

19. The apparatus of claim 16, wherein the support structure further comprises:
   a channel for one or more cables that couple to one or more of the motor assembly and antennas held by the pair of antenna holders, the channel including one or more elastic bands for maintaining the one or more cables in place; and
wherein the one or more elastic bands are coupled to the support structure and contract as the pair of antenna carriers move toward the top of the mechanical arch and expand as the pair of antenna carriers move away from the top of the mechanical arch.

20. The apparatus of claim 16, wherein a positional resolution of each of the pair of antenna carriers is less than one degree.

* * * * *